No. 644,873. Patented Mar. 6, 1900.
J. SCHWEITZER.
APPARATUS FOR PREPARING DOUGH.
(Application filed Dec. 27, 1897.)
(No Model.) 2 Sheets—Sheet 1.
FIG. 1.
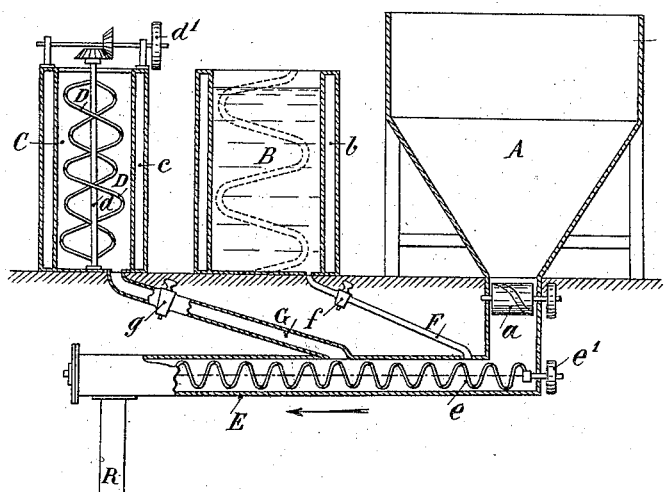
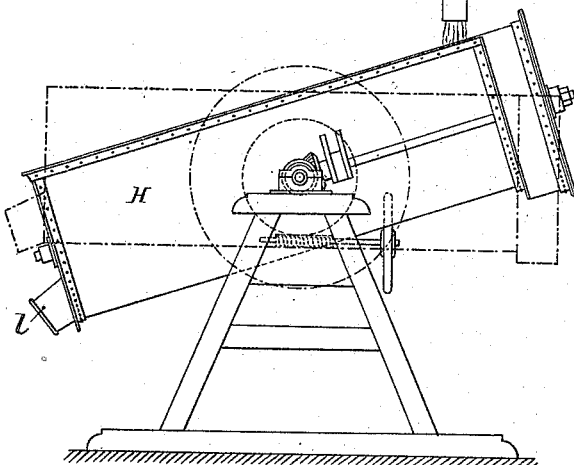
FIG. 2.
FIG. 3.
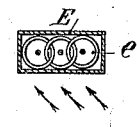
Witnesses
Edwin Drew Bartlett
Frank James Ames.
Inventor
Joseph Schweitzer
per Herbert Sefton-Jones
Attorney.

No. 644,873. Patented Mar. 6, 1900.
J. SCHWEITZER.
APPARATUS FOR PREPARING DOUGH.
(Application filed Dec. 27, 1897.)
(No Model.) 2 Sheets—Sheet 2.

Witnesses.
Edwin Drew Bartlett
Frank James Ames

Inventor
Joseph Schweitzer
per Herbert Sefton-Jones
Attorney

UNITED STATES PATENT OFFICE.

JOSEPH SCHWEITZER, OF PARIS, FRANCE, ASSIGNOR TO LA SOCIÉTÉ INTERNATIONALE DE MEUNERIE ET DE PANIFICATION, (SYSTÈME SCHWEITZER,) OF BRUSSELS, BELGIUM.

APPARATUS FOR PREPARING DOUGH.

SPECIFICATION forming part of Letters Patent No. 644,873, dated March 6, 1900.

Application filed December 27, 1897. Serial No. 664,538. (No model.)

*To all whom it may concern:*

Be it known that I, JOSEPH SCHWEITZER, engineer, of 1 Rue Mehul, Paris, in the Republic of France, have invented Improvements in Apparatus for Preparing Dough, (for which I have obtained Letters Patent in France, dated June 8, 1897, No. 267,667; in Belgium, dated June 30, 1897, No. 129,193, and in Luxemburg, dated October 28, 1897, No. 2,997;) of which the following is a specification.

This invention relates to apparatus for preparing dough, and has for its object the provision of effective and economical means for continuously and uniformly mixing and kneading the said dough.

Figure 4:
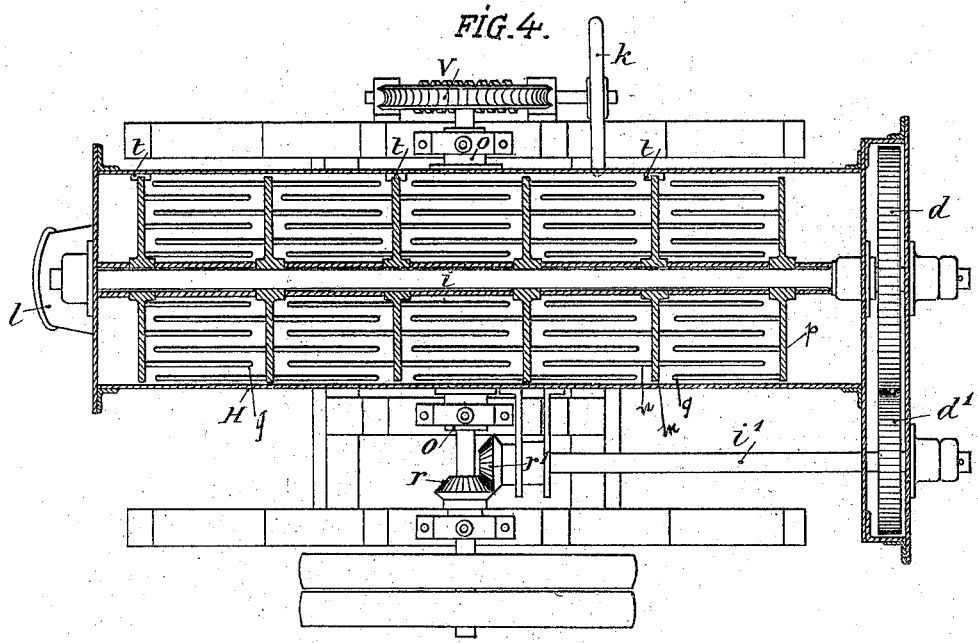
Figure 5:
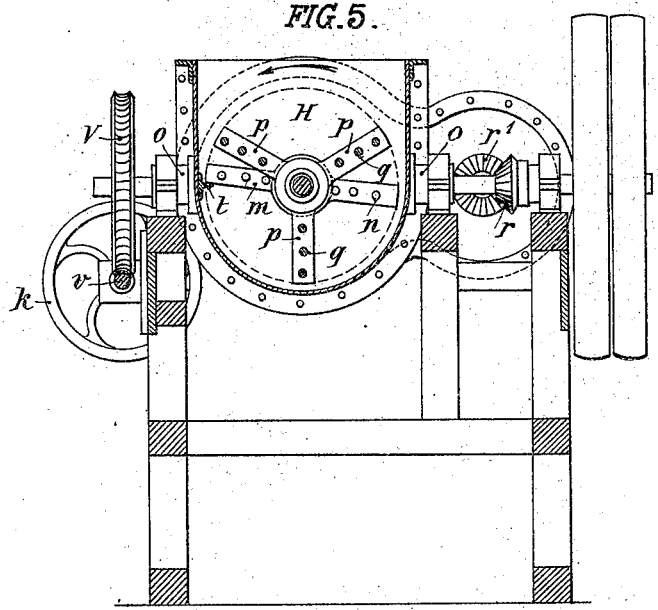

Referring to the drawings accompanying this specification, Figure 1 shows a sectional elevation of the entire apparatus. Figs. 2 and 3 are sections of the mixing-channel, showing two modifications of the mixing device. Fig. 4 is a horizontal section of the kneading apparatus. Fig. 5 is a sectional elevation of the same.

In the drawings, A represents the meal-box, preferably in the form of a hopper and the outlet thereof regulated by a revolving distributer $a$ or the like.

B is a tank containing water suitably salted and kept at the proper temperature by means of a steam-jacket $b$, or by means of a steam coil or worm, (shown in dotted lines in the drawings,) or by other convenient means.

C is a barm or yeast vessel which is also heated to the proper temperature by a steam-jacket $c$ and in which is arranged an agitator serving to thoroughly mix and stir up the substances placed in the vessel C.

This apparatus is preferably constructed as follows: On the vertical shaft $d$, driven either by hand or by means of gearing, as shown, actuated by a pulley $d'$ or equivalent means, are fixed two metallic rods or wires D, coiled so as to form two concentric spirals of a different diameter having equal but inverse pitches. At the points where these two spirals meet they may advantageously be connected together by means of screws or the like, thus strengthening the apparatus, which may be further strengthened by attaching it to the central shaft $d$ by means of intermediate arms connected to the spirals, as well as by attaching the spirals to the shaft at top and bottom, as shown. When the aforesaid mechanism is caused to rotate, it will thoroughly mix the substances in the vessel C and also tend to raise any deposit which may form at the bottom, and thus secure the homogeneity of the contents. The mixing apparatus consists of the tube, box, or channel E, having located within it the spiral or spirals $e$, preferably two in number, placed parallel one to another and rotated by a pulley $e'$ or other convenient device. In Fig. 2 two spirals $e$ are shown, and in Fig. 3 three such spirals partially intersecting are illustrated. The speed of these spirals may be the same or different one from another, or one may be rotated in the one direction and the other in the opposite direction, as may be found desirable. The mixing-channel D is connected to the kneading-trough H by the tube R, to the water vessel B by means of the pipe F, having stop-cock $f$, and to the yeast vessel C by means of the pipe G with stop-cock $g$. The kneading-trough H is shown in Fig. 1 in combination with the rest of the machine, in Fig. 4 in transverse section viewed from above, and in Fig. 5 in transverse section in elevation. This apparatus consists, essentially, of a cylinder H, mounted on trunnions and having internally a longitudinal axial shaft bearing a number of arms provided with spindles or blades, as shown. The trough H has an inlet-opening communicating with the tube R, an outlet-opening $l$ for the finished material, and the worm-wheel V, operated by the handwheel $k$ on the worm-shaft, whereby the trough H can be set at any desired angle. The trough H is provided internally with the shaft $i$, carrying arms $p$, on which are fixed spindles $q$, arranged to alternate during the revolution of the shaft with similar spindles $n$ on the fixed arms $m$. By this device continuous preparation and delivery of the dough supplied through the tube R and delivered from the outlet $l$ take place.

It is a special feature of my invention that the aforesaid spindles $n$ and the spindles $q$, between which the kneading and drawing out of the dough are effected, are arranged parallel to the axis of rotation $i$ of the apparatus, whereas in various kinds of dough-kneading apparatus hitherto used having fixed and movable spindles for working the dough the said spindles are placed transversely to the axis of rotation, and they consequently continuously cut the dough into which the movable spindles enter. In my improved device, on the contrary, the dough is constantly lengthened by the action of the spindles and it soon stretches out in strips which tend to wind up in the form of skeins on the movable spindles aforesaid. The number of fixed arms *m* and of the spindles *n* may be varied, as well as the number of movable arms *p* and their spindles *q*, and these spindles *n* and *q*, respectively, may be secured either at right angles or obliquely on the arms supporting the same and may be made straight, as shown in the drawings, or more or less curved, as desired.

With regard to the stationary arms *m*, bearing the spindles *n*, it should be explained that these arms are devised to remain stationary during the revolution of the arms *p*. For this purpose they are preferably mounted loose upon the central shaft *i* and their rotation is prevented by striking against the projections *t*, fixed to the sides of the cylinder. By means of the worm-wheel and gearing aforesaid the trough H can have given to it any desired amount of inclination. The shaft *i* is driven by means of the gear-wheels *d d'*. The wheel *d'* is keyed upon a shaft *i'*, which is actuated by means of fixed and loose pulleys by the interposition of the cone-gearing *r r'*. The wheel *r* is preferably arranged on a prolongation of the trunnion O in such a manner that the shaft *i* will be actuated in the same manner whatever may be the degree of inclination of the trough H.

The apparatus operates as follows: The meal arriving from the rotating distributer *a* and the salted water supplied through the pipe F, controlled by the cock *f*, are thoroughly agitated and mixed together by the rapid rotation of the spiral wires *e*. The dough thus formed receives, near the center of the channel E, the diluted yeast arriving from the vessel C through the pipe G, controlled by the cock *g*. The mixing of the dough continues until the same reaches the end of the channel E, the length of which is designed according to the degree of preparation of the dough which it is desired to obtain. The meal thus mixed with the water and yeast arrives, by reason of the movement of the spirals *e*, above indicated, into the kneading-trough H. Here it is subjected to the energetic action of the spindles *n* and *q*, respectively, which, operating in a direction sensibly parallel to the central shaft *i*, tend to work the paste or dough into the form of skeins or strips. The dough is thus subjected under large surfaces constantly renewed to the action of the air reaching it either naturally or blown by artificial means into the apparatus. The dough gradually descends in consequence of the inclined position in which the kneading-trough H is placed during the kneading operation and finally escapes at the outlet *l*. The apparatus is especially designed for continuous operation.

What I claim is—

1. In a mixer, a hopper for solid material, a mixing-channel, a tank for liquid-supply connected to said channel, means for mixing the liquid and solid in said channel, a kneading-trough, means for altering and fixing the inclination of said trough, a longitudinal shaft in said trough, gearing for continuously rotating the said shaft at all inclinations of the trough, loose arms on said shaft bearing spindles sensibly parallel to the central shaft, stops on the internal walls of said kneading-trough preventing the rotation of said arms, arms rigidly secured on said shaft and rotating therewith, and spindles on said rotating arms parallel to and intermediate with the stationary spindles aforesaid.

2. In a dough-mixer, the meal-hopper A, water-tank B, yeast vessel C provided with duplex spiral stirrer D, mixing-channel E, spiral mixing-wires *e* in combination with the kneading-trough H supported on trunnions O and provided with geared shaft *i*, loose arms *m*, spindles *n*, stops *t*, arms *p* and spindles *q*.

3. In a device of the character described, a trough, a shaft journaled therein, loose arms on said shaft bearing spindles parallel to the shaft, stops on the trough preventing the rotation of said arms, arms rigidly secured on said shaft to rotate therewith, and spindles on said rotating arms parallel to and intermediate of the stationary spindles, substantially as described.

4. In a device of the character described, a trough mounted on suitable bearings, means for inclining the trough in its bearings, a shaft journaled in the trough, gearing for continuously rotating the shaft at all inclinations of the trough, fixed arms bearing spindles parallel with the shaft, and arms loosely mounted on the shaft and carrying spindles intermediate of the first-named spindles and also parallel to the shaft, substantially as described.

5. In a device of the character described, a trough, a shaft journaled in the longitudinal axis thereof, loose arms on the shaft bearing spindles parallel to said shaft, arms rigidly secured on the shaft and bearing spindles intermediate of and parallel to the first-named spindles, a conduit containing parallel worm-screws discharging into the trough, and a flour-hopper, a salt-water tank and a yeast vessel discharging into the conduit, substantially as described.

In testimony whereof I have signed my name to this specification in the presence of two subscribing witnesses.

JOSEPH SCHWEITZER.

Witnesses:
 JACQUES CONDOMY,
 LEON MARTYE.